(12) United States Patent
Brown

(10) Patent No.: US 11,346,531 B2
(45) Date of Patent: May 31, 2022

(54) ILLUMINATION APPARATUS HAVING AN ATTACHMENT ASSEMBLY FOR RELEASABLE ATTACHMENT TO A FLEXIBLE SHEET

(71) Applicant: FUSE, LLC, Memphis, TN (US)

(72) Inventor: Matthew S. Brown, Falkner, MS (US)

(73) Assignee: FUSE, LLC, Memphis, TN (US)

( * ) Notice: Subject to any disclaimer, the term of this patent is extended or adjusted under 35 U.S.C. 154(b) by 0 days.

(21) Appl. No.: 16/860,339

(22) Filed: Apr. 28, 2020

(65) Prior Publication Data
US 2020/0256547 A1  Aug. 13, 2020

Related U.S. Application Data

(63) Continuation-in-part of application No. PCT/US2018/057981, filed on Oct. 29, 2018.
(Continued)

(51) Int. Cl.
*F21V 21/08* (2006.01)
*E04H 15/10* (2006.01)
(Continued)

(52) U.S. Cl.
CPC ......... *F21V 21/0832* (2013.01); *E04H 15/10* (2013.01); *F21S 4/26* (2016.01); *F21V 19/004* (2013.01); *F21V 19/0045* (2013.01); *F21V 21/088* (2013.01); *F21V 21/096* (2013.01); *F21V 21/34* (2013.01); *F21Y 2115/10* (2016.08)

(58) Field of Classification Search
CPC ...... F21V 21/08; F21V 21/0832; F21V 21/34; F21V 19/0045; F21V 19/004; F21V 21/0816; F21V 21/088; F21V 21/35; F21S 4/22; F21S 4/24; F21S 4/26; F21S 4/20; E04H 15/10
See application file for complete search history.

(56) References Cited

U.S. PATENT DOCUMENTS 4,871,597 A   10/1989  Hobson
4,886,183 A   12/1989  Fleming
(Continued)

FOREIGN PATENT DOCUMENTS

| CN | 204627108 U | * 9/2015 | ............. E04H 15/10 |
| GB | 2530484 A | 3/2016 | |
| KR | 100661404 B1 | * 12/2006 | .......... F21V 19/0045 |

*Primary Examiner* — Alan B Cariaso
(74) *Attorney, Agent, or Firm* — Ashley Law Firm P.C.; Stephen S. Ashley, Jr.

(57) ABSTRACT

An illumination apparatus can include a light assembly having a housing section and an attachment section. At least one light emitting device is contained within the housing section. The attachment assembly can include a substantially flat base section and an attachment member extending outwardly from the base section. The attachment section of the light assembly can define a recess having a size and shape that is complementary to the attachment member of the attachment assembly, such that the light assembly and the attachment assembly can be releasably attached to each other by complementary frictional engagement of the attachment member of the attachment assembly and the attachment section of the light assembly when the attachment member is positioned within the attachment section.

17 Claims, 14 Drawing Sheets

Related U.S. Application Data

(60) Provisional application No. 62/895,718, filed on Sep. 4, 2019, provisional application No. 62/852,572, filed on May 24, 2019, provisional application No. 62/578,455, filed on Oct. 29, 2017.

(51) Int. Cl.
*F21V 19/00* (2006.01)
*F21S 4/26* (2016.01)
*F21V 21/088* (2006.01)
*F21V 21/096* (2006.01)
*F21V 21/34* (2006.01)
*F21Y 115/10* (2016.01)

(56) References Cited

U.S. PATENT DOCUMENTS

| | | |
|---|---|---|
| 4,970,631 A | 11/1990 | Marshall |
| 5,119,279 A | 6/1992 | Makowsky |
| 5,207,076 A | 5/1993 | Sciarrillo |
| 5,415,305 A | 5/1995 | Drake-Tipton et al. |
| 5,969,592 A | 10/1999 | Reed |
| 6,092,905 A | 7/2000 | Kochn |
| 6,158,870 A | 12/2000 | Ramirez |
| 6,286,709 B1 | 9/2001 | Hudson |
| 6,786,614 B2 | 9/2004 | Ciarrocchi, Jr. |
| D516,875 S | 3/2006 | Hicks et al. |
| 7,021,594 B2 | 4/2006 | Exler |
| D533,751 S | 12/2006 | Exler |
| D547,618 S | 7/2007 | Exler |
| 7,922,031 B1 | 4/2011 | Prince |
| 8,334,780 B1 | 12/2012 | Mendoza, Jr. |
| 8,752,726 B2 | 6/2014 | Molz |
| 8,870,018 B2 | 10/2014 | Cook et al. |
| 9,568,186 B2 | 2/2017 | Brown |
| 9,671,158 B1 | 6/2017 | Sandberg et al. |
| 9,689,562 B2 * | 6/2017 | Volpato .................... F21S 4/28 |
| 10,827,863 B2 | 11/2020 | Brown et al. |
| 10,996,488 B2 | 5/2021 | Brown |
| 2002/0188657 A1 | 12/2002 | Lary et al. |
| 2006/0196218 A1 | 9/2006 | Mogil |
| 2008/0198579 A1 | 8/2008 | Crye et al. |
| 2008/0285621 A1 | 11/2008 | Rowen |
| 2010/0157584 A1 * | 6/2010 | Ho ........................... F21S 4/00 362/223 |
| 2011/0102304 A1 | 5/2011 | Nelson |
| 2011/0222272 A1 | 9/2011 | Yeh |
| 2012/0002400 A1 | 1/2012 | Lindholm |
| 2013/0168399 A1 | 7/2013 | Harrison-Griffin |
| 2014/0119004 A1 * | 5/2014 | Yuan ....................... F21V 19/04 362/231 |
| 2014/0268777 A1 * | 9/2014 | Saydkhuzhin .......... F21V 19/04 362/249.04 |
| 2015/0070884 A1 * | 3/2015 | Wu ..................... F21V 21/0832 362/221 |
| 2015/0077975 A1 | 3/2015 | Brown |
| 2015/0182046 A1 | 7/2015 | Walsh |
| 2015/0259945 A1 | 9/2015 | Klinkel et al. |
| 2015/0366383 A1 | 12/2015 | Raunio et al. |
| 2016/0010845 A1 | 1/2016 | Brown |
| 2016/0123572 A1 | 5/2016 | Mohadjeri |
| 2016/0348890 A1 * | 12/2016 | Polanowski ............ H04R 1/028 |
| 2020/0284424 A1 | 9/2020 | Brown |
| 2021/0052097 A1 | 2/2021 | Brown et al. |

\* cited by examiner

ILLUMINATION APPARATUS HAVING AN ATTACHMENT ASSEMBLY FOR RELEASABLE ATTACHMENT TO A FLEXIBLE SHEET

CROSS REFERENCE TO RELATED APPLICATIONS

This application is a continuation in part of International Application No. PCT/US2018/057981, filed Oct. 29, 2018, which claims priority to U.S. Provisional Patent Application No. 62/578,455, filed Oct. 29, 2017. In addition, this application claims priority to U.S. Provisional Patent Application No. 62/852,572, filed May 24, 2019, and U.S. Provisional Patent Application No. 62/895,718, filed Sep. 4, 2019. All of said applications are incorporated herein by reference.

TECHNICAL FIELD

The present invention relates to illumination devices. One embodiment of the invention comprises an illumination device adapted for being attached to a structure, such as a tent or canopy.

BACKGROUND

Tents, canopies, and similar temporary shelters are commonly used in outdoor recreational activities, such as camping, picnics and sporting events. Such activities are often done outdoors at night, in locations that do not have permanent lighting available. As such, there is a need for an illumination device that can be easily mounted to a tent, canopy or similar structure.

SUMMARY

One object of the present invention is to provide an illumination device that can be mounted on a support structure. Another object of the invention is to provide a convenient means for illuminating the area under a tent or canopy. Another object of the present invention is to provide an illumination device that can be mounted to existing tents, canopies, and similar shelter structures. These and other objects of the invention can be achieved in one or more embodiments of the invention described herein.

One embodiment of the invention comprises a portable illumination apparatus adapted for releasable attachment to a support structure.

Another embodiment of the invention comprises an illumination apparatus adapted to be mounted to a tent, canopy or like structure, and illuminate the area within and around the tent or canopy.

Another embodiment of the invention comprises a kit comprising an illumination device and a mounting device. The mounting device is adapted to be attached to a tent, canopy or like structure, and is adapted for releasable attachment to the illumination device. According to an embodiment of the invention, the illumination device can comprise an elongate structure having an elongate channel formed therein. The mounting device can include a complementary member adapted to be received and retained within the channel of the illumination device.

Another embodiment of the invention comprises an illumination apparatus comprising a light assembly comprising a housing section and an attachment section. At least one light emitting device is contained within the housing section. An attachment assembly is adapted for releasable attachment with the attachment section of the light assembly.

According to another embodiment of the invention, the attachment assembly comprises a substantially flat base section and an attachment member extending outwardly from the base section.

According to another embodiment of the invention, the attachment section of the light assembly defines a recess having a size and shape that is complementary to the attachment member of the attachment assembly, such that the light assembly and the attachment assembly can be releasably attached to each other by complementary frictional engagement of the attachment member of the attachment assembly and the attachment section of the light assembly when the attachment member is positioned within the attachment section.

According to another embodiment of the invention, the light assembly can slide on the attachment assembly when the attachment member is positioned in the attachment section.

According to another embodiment of the invention, the attachment assembly is attached to a substantially rectangular fabric sheet comprising an outer surface and an inner surface, and first and second opposed sides.

According to another embodiment of the invention, the attachment assembly is attached to the outer surface of the fabric sheet, and first and second complementary fasteners are adapted for releasable engagement with each other. The first fastener is positioned on the outer surface of the fabric sheet proximate the first side, and the second fastener is positioned on the inner surface of the fabric sheet proximate the second side.

According to another embodiment of the invention, the first and second complementary fasteners can be hook and loop fasteners, magnets and/or buttons.

According to another embodiment of the invention, the first fastener can be a plurality of loop fasteners, and the second fastener can be a plurality of hook fasteners.

Another embodiment of the invention comprises an illumination apparatus comprising a flexible sheet comprising an outer surface and an inner surface and first and second opposed sides. A light assembly comprising at least one light emitting device is releasably attached to the outer surface. First and second complementary fasteners are adapted for releasable engagement with each other. The first fastener is positioned on the sheet proximate the first side, and the second fastener is positioned on the sheet proximate the second side.

According to another embodiment of the invention, the flexible sheet comprises a fabric.

According to another embodiment of the invention, the first fastener is positioned on the outer surface, and the second fastener is positioned on the inner surface.

According to another embodiment of the invention, the flexible sheet is rectangular.

According to another embodiment of the invention, the first and second complementary fasteners can be hook and loop fasteners, magnets and/or buttons.

According to another embodiment of the invention, the first fastener comprises a plurality of loop fasteners, and the second fastener comprises a plurality of hook fasteners.

According to another embodiment of the invention, the first fastener comprises a plurality of hook fasteners, and the second fastener comprises a plurality of loop fasteners.

According to another embodiment of the invention, at least one pouch is positioned on the outer surface of the flexible sheet, and the light assembly is positioned within the pouch.

According to another embodiment of the invention, an attachment assembly is attached to the outer surface of the flexible sheet and is adapted for releasable attachment with the light assembly. The attachment assembly comprises a substantially flat base section and an attachment member extending outwardly from the base section. The light assembly comprises a housing section containing at least one light emitting device therein and an attachment section defining a recess having a size and shape that is complementary to the attachment member of the attachment assembly. The light assembly and the attachment assembly are releasably attached to each other by complementary frictional engagement of the attachment member of the attachment assembly and the attachment section of the light assembly when the attachment member is positioned within the attachment section.

Another embodiment of the invention comprises a tent apparatus comprising: a support frame, a flexible sheet carried on the support frame, and an attachment assembly attached to the flexible sheet. A light assembly comprises a housing section containing at least one light emitting device therein and an attachment section adapted for releasable attachment to the attachment assembly.

According to another embodiment of the invention, the attachment assembly comprises a substantially flat base section and an attachment member extending outwardly from the base section. The attachment section of the light assembly defines a recess having a size and shape that is complementary to the attachment member of the attachment assembly, whereby the light assembly and the attachment assembly are releasably attached to each other by complementary frictional engagement of the attachment member of the attachment assembly and the attachment section of the light assembly when the attachment member is positioned within the attachment section.

According to another embodiment of the invention, the base section of the attachment assembly is sewn to the flexible sheet of the tent.

DETAILED DESCRIPTION OF PREFERRED EMBODIMENTS

Figure 1:
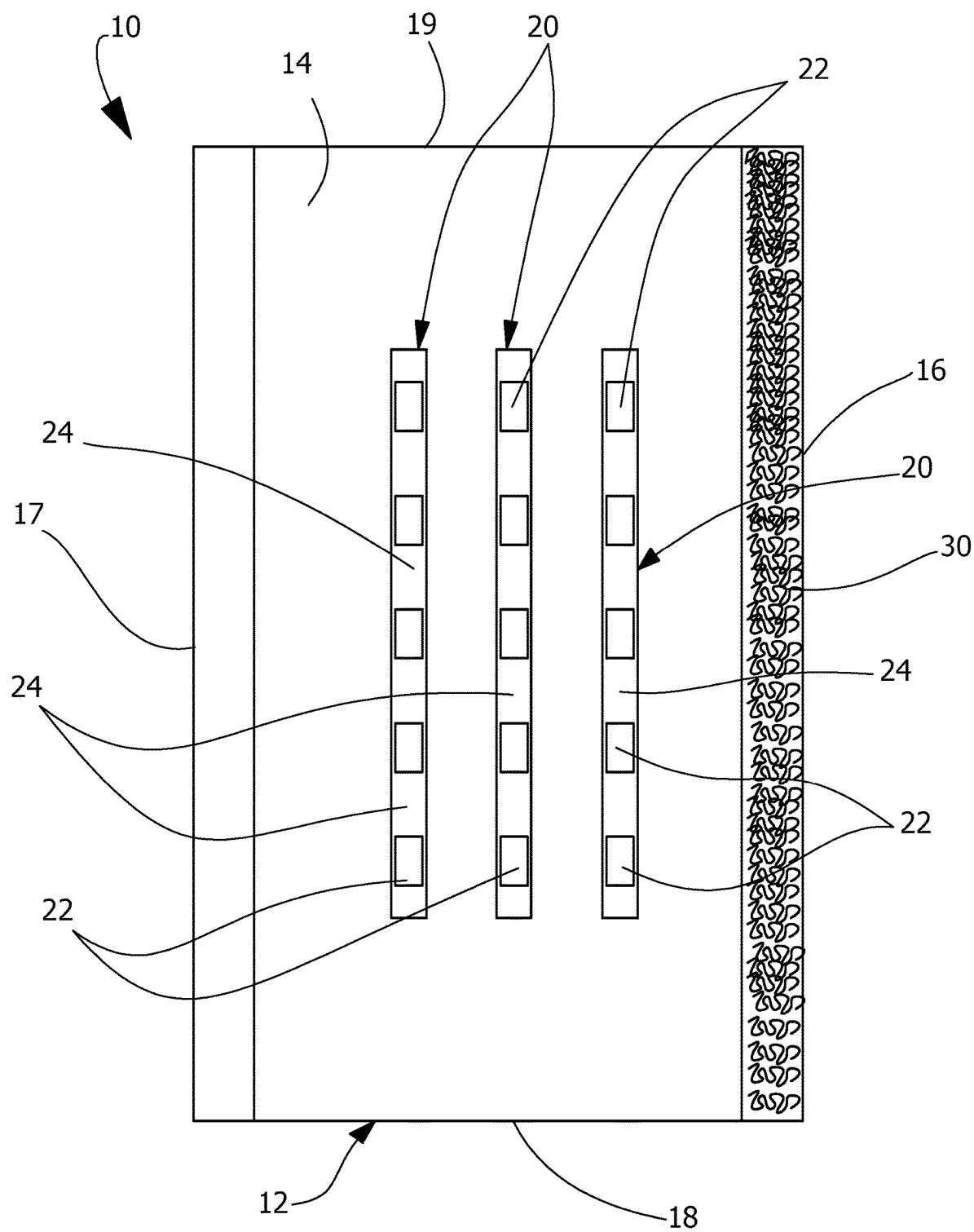
FIG. 1 is perspective view of an illumination apparatus according to a preferred embodiment of the invention.
Figure 2:
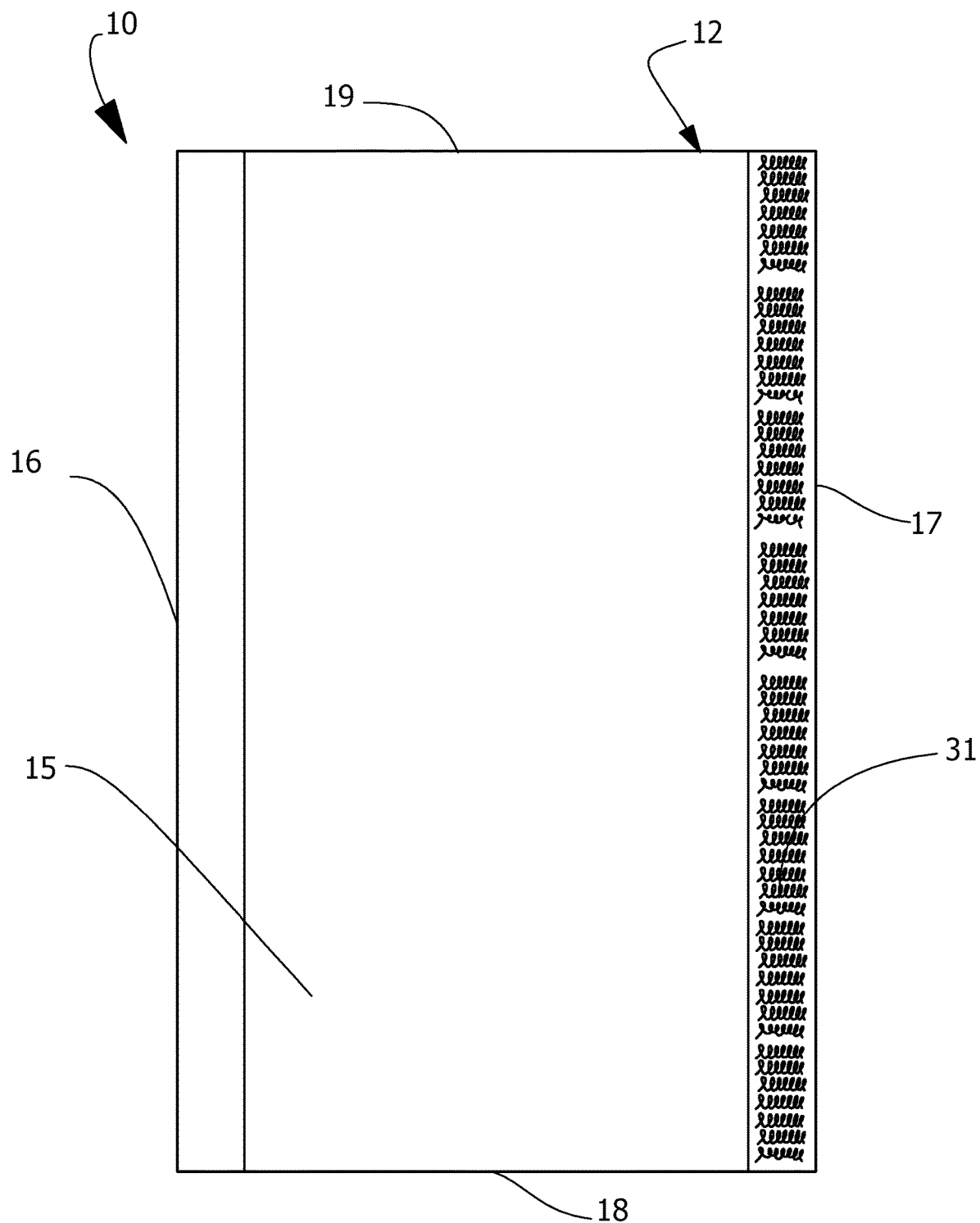
FIG. 2 is another perspective view of the illumination apparatus of FIG. 1.

An illumination apparatus according to a preferred embodiment of the invention is illustrated in FIGS. 1 and 2, and shown generally at reference numeral 10. The illumination apparatus 10 comprises a sheet 12 of flexible material, such as a fabric, and a plurality of light assemblies 20 attached to the fabric sheet 12. The fabric sheet 12 can be comprised of polyester, canvas, or other suitable flexible material. The light assemblies 20 can be made of polyvinyl chloride (PVC) or other suitable material.

The fabric sheet 12 preferably has a substantially rectangular shape, as shown in FIGS. 1 and 2. The sheet 12 has an outer surface 14, shown in FIG. 1, and an inner surface 15, shown in FIG. 2. The light assemblies 20 are positioned on the outer surface 14, as shown in FIG. 1. The sheet 12 has opposed sides 16, 17 extending longitudinally along the length of the cover 12, and two shorter opposed ends 18, 19 extending substantially perpendicularly to opposed sides 16, 17, as shown in FIG. 1.

Figure 4:
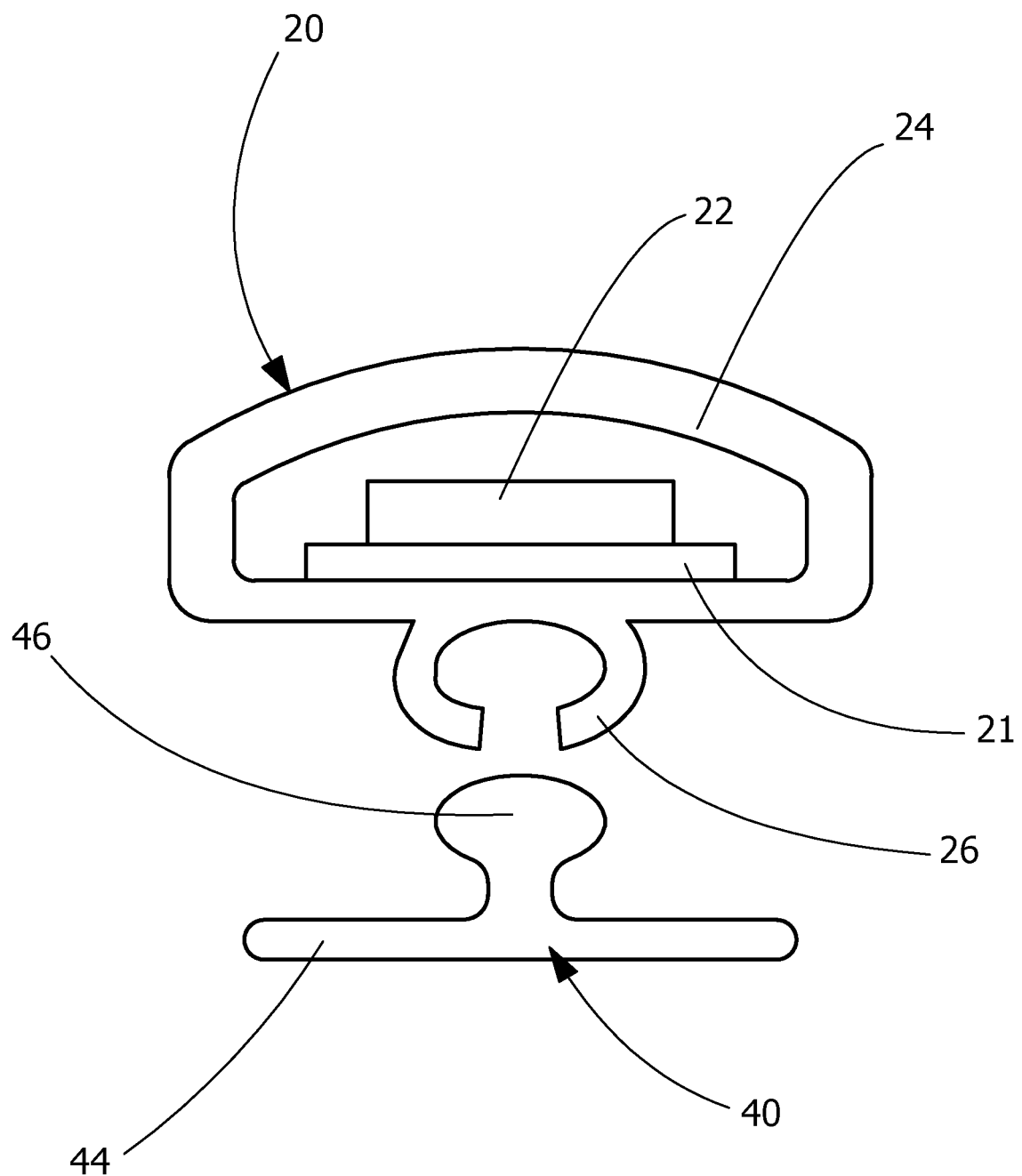
FIG. 4 is a side profile of an illumination apparatus according to an embodiment of the invention.
Figure 5:
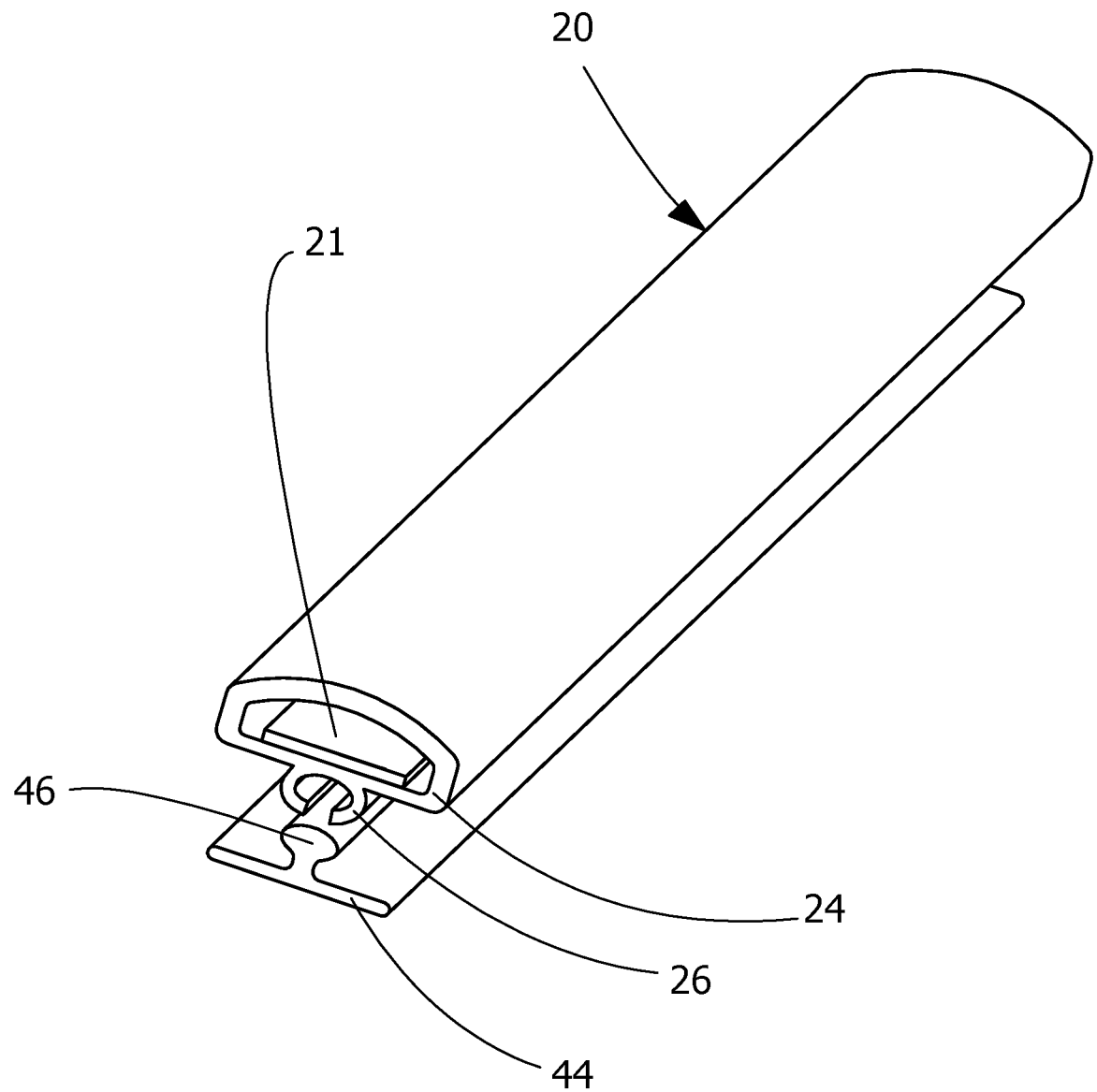
FIG. 5 is a perspective view of the illumination apparatus of FIG. 4.

Each light assembly 20 comprises at least one light emitting device. Preferably, each light assembly 20 is comprised of a housing section 24 and an attachment section 26, as shown in FIGS. 4 and 5. Contained within the housing 24 is a light emitting device, such as a string 21 of light emitting diodes 22, as shown in FIGS. 4-8. Alternatively, the light emitting devices can be incandescent light bulbs or illuminated fiber optic cables. The LED string 21 can be powered by a USB connector 27 that can be operatively connected to the LED string 21 and a power unit 60, as shown in FIG. 7. Each end of the housing section 24 can be closed with a removable seal cover 28, shown in FIG. 8. Some or all of the housing section 24 is comprised of a transparent or translucent material so that light emitted from the light emitting diodes 22 is visible through the housing section 24.

Figure 3:
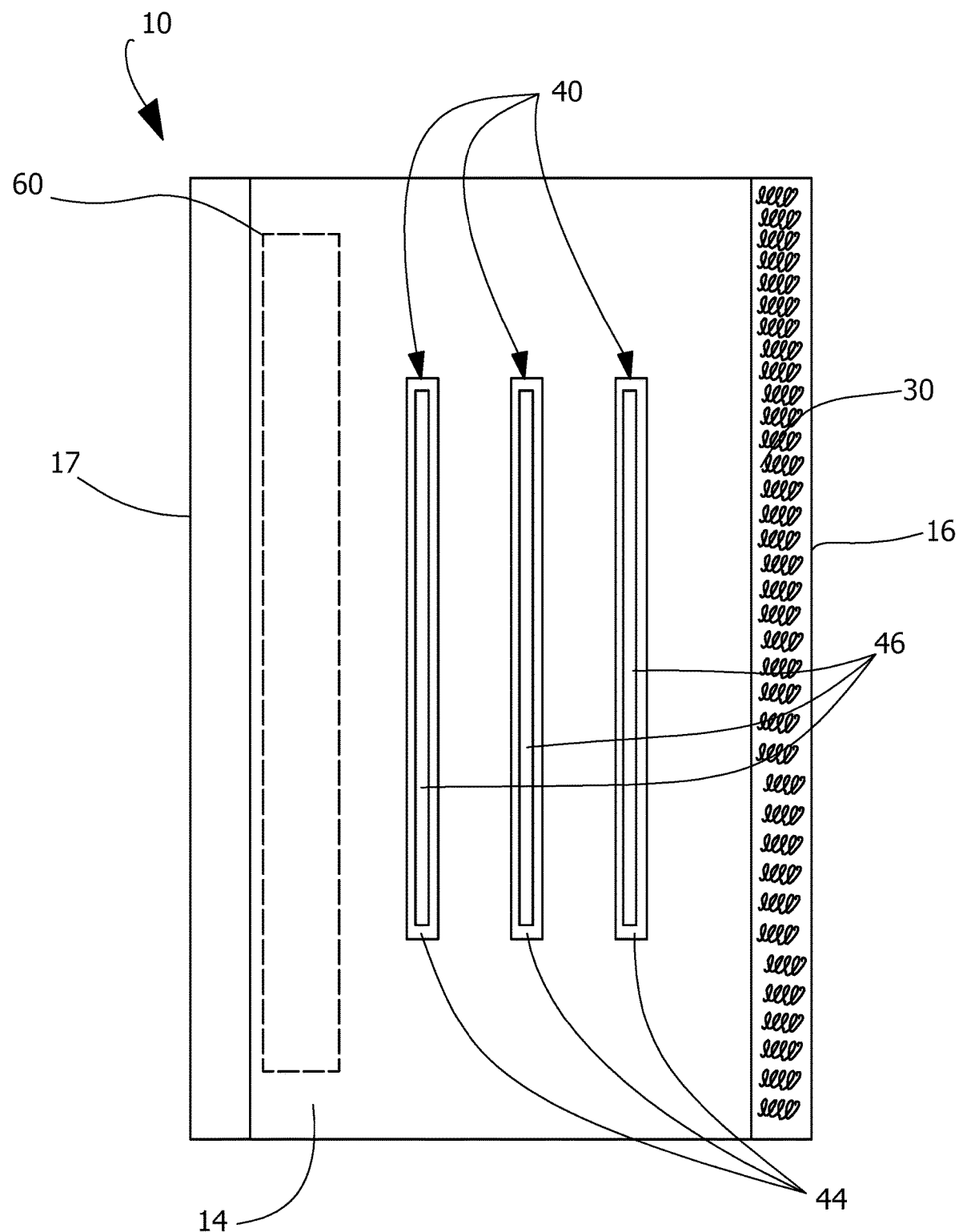
FIG. 3 is another perspective view of the illumination apparatus of FIG. 1.

Each light assembly 20 can be attached to the fabric sheet 12 by way of an attachment assembly 40. Each attachment assembly 40 can be an elongate rail-like assembly comprised of a base section 44 and an attachment member 46 extending upwardly from the base 44, as shown in FIGS. 4 and 5. The attachment assemblies 40 are attached to the outer surface 14 of the fabric sheet, as shown in FIG. 3. Preferably, the base 44 of each attachment assembly 40 is sewn to the fabric sheet 12. Alternatively, the attachment assemblies 40 can be attached to the fabric sheet 12 by other means, such as an adhesive applied to the under surface of the base 44. The attachment assembly 40 can be made of silicone or other suitable material. The light assembly 20 and the attachment assembly 40 are elongate and approximately equal in length.

The attachment section 26 of each light assembly 20 can define a recessed channel, as shown in FIG. 4. The recessed channel defined by the attachment section 26 of each light assembly 20 and that attachment member 46 of each attachment assembly 40 are sized and shaped for complementary frictional engagement with each other. As shown in FIG. 4, the attachment member 46 can have an oval head and the attachment section 26 of the light assembly 20 can define an similar oval shape of slightly larger size so that the attachment member 46 can be slid into the recessed channel of the attachment section 26 and retained therein, as shown in FIG. 6.

Figure 6:
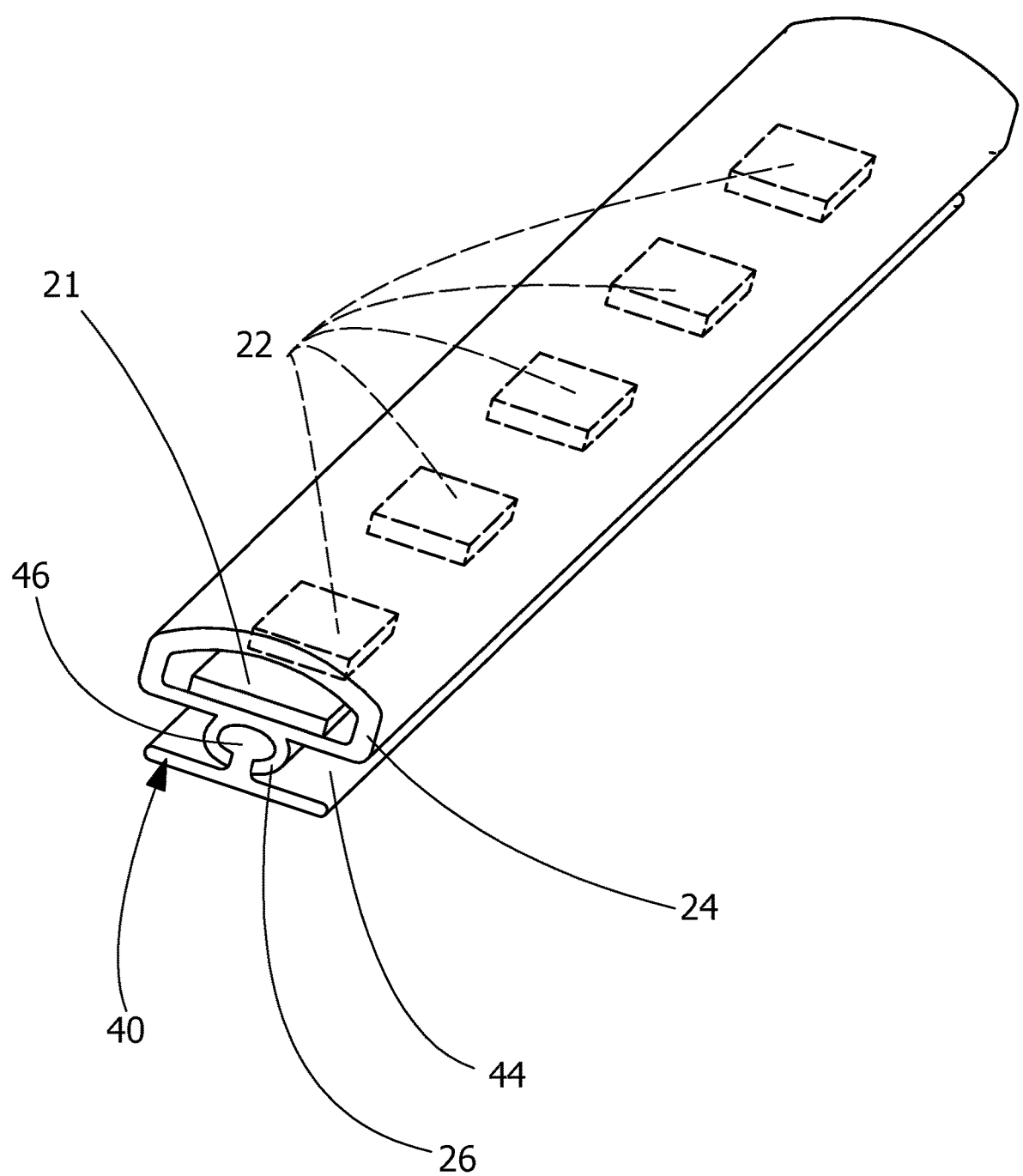
FIG. 6 is another perspective view of the illumination apparatus of FIG. 4.
Figure 7:
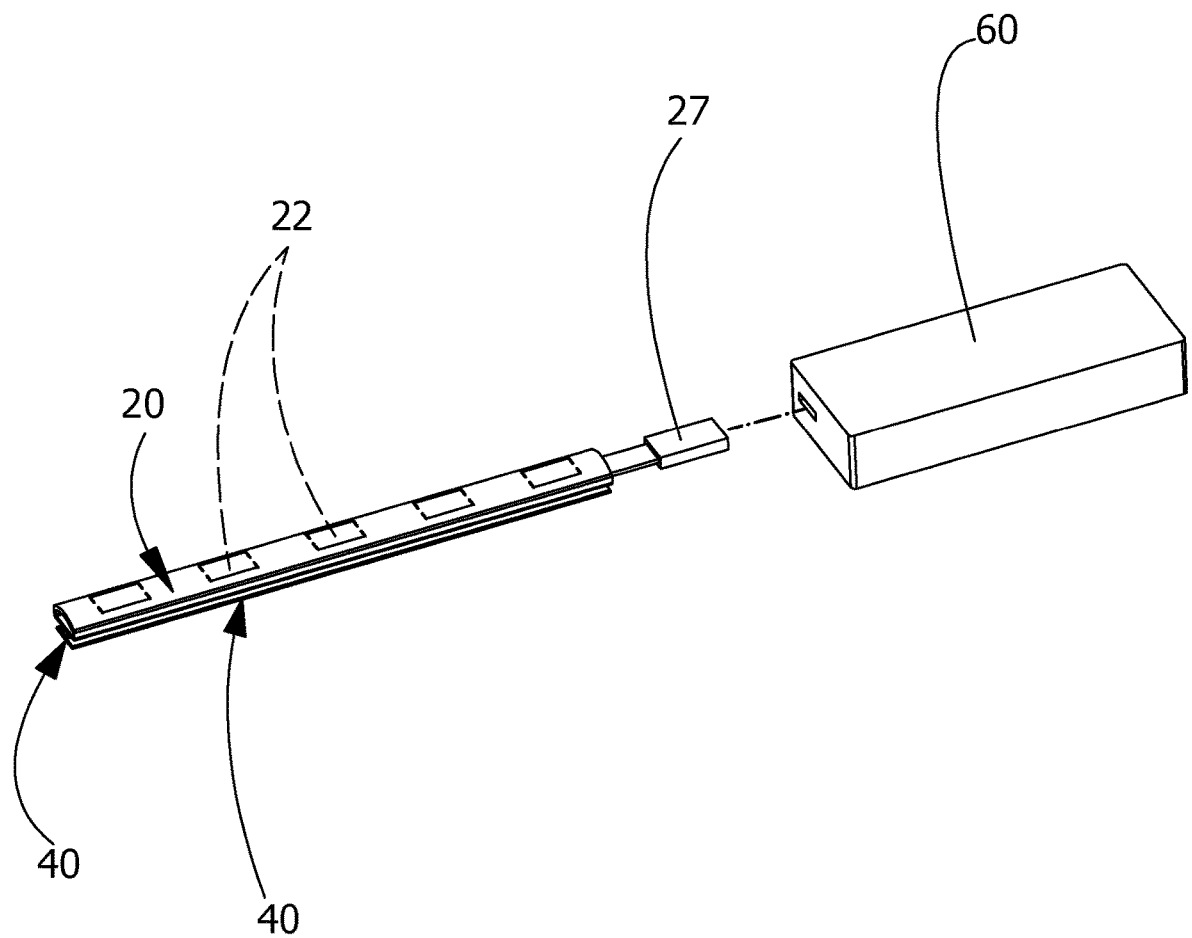
FIG. 7 is another perspective view of the illumination apparatus of FIG. 4.
Figure 8:
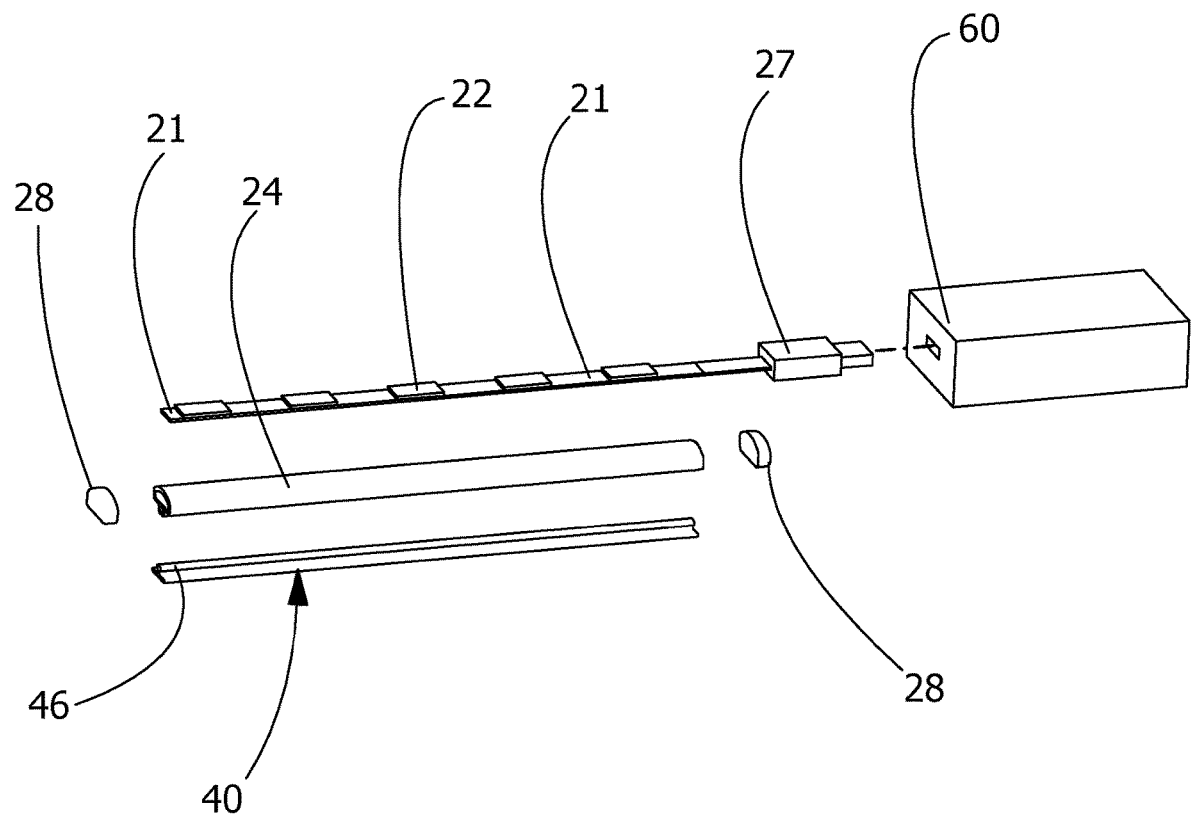
FIG. 8 is an exploded perspective view of the illumination apparatus of FIG. 4.

The light assembly 20 can be releasably attached to the attachment assembly 40 by aligning one end of the attachment section 26 with an end of the attachment member 44 and sliding the light assembly 20 until the attachment member 46 is positioned entirely within the attachment section 26 of the light assembly 20, as shown in FIG. 6. As such, the light assembly 20 and attachment assembly 40 are releasably engaged to each other. The light assembly 20 can be released from the attachment assembly 40 by sliding the light assembly 20 off of the complementary attachment member 46 of the attachment assembly 40. As such, the light assembly 20 can be easily removed for various reasons such as charging with the power unit 60 or replacing burned out light emitting diodes 22.

The sheet 12 comprises means for releasably attaching the opposed sides 16, 17 to each other. Complementary fasteners can be positioned proximate the opposed sides 16, 17 that are adapted for releasable engagement with each other. Preferably, the complementary fasteners comprise hook and loop fasteners. As shown in FIGS. 1 and 2, a section of loop fasteners 30 can be attached on the outer surface 14 of the sheet 12 proximate one side 16, and a section of hook fasteners 31 can be attached on the inner surface 15 proximate the opposed side 17. The hook and loop sections 31, 30 can be sewn to the sheet 12, or attached by other suitable means such as an adhesive. Alternatively, hook fasteners 31 can be attached on the outer surface 14 of the cover 12 proximate side 16, and loop fasteners 30 can be attached on the inner surface 15 proximate the opposed side 17. Alternatively, the complementary fasteners can be magnets, snaps or buttons.

The apparatus 10 includes a power source operatively connected to the light emitting diodes 20 to power the light emitting diodes 20. The power source can be a power unit 60 comprising a battery that can be operatively connected to the light emitting diodes 22. The fabric sheet 12 can include a pouch for containing the power unit 60, as shown in FIG. 3. Alternatively, the power source can be a solar cell that powers the light emitting diodes 22. Preferably, the power source comprises a solar cell that recharges a battery. As such, the battery can be recharged when the apparatus 10 is exposed to sunlight.

Figure 14:
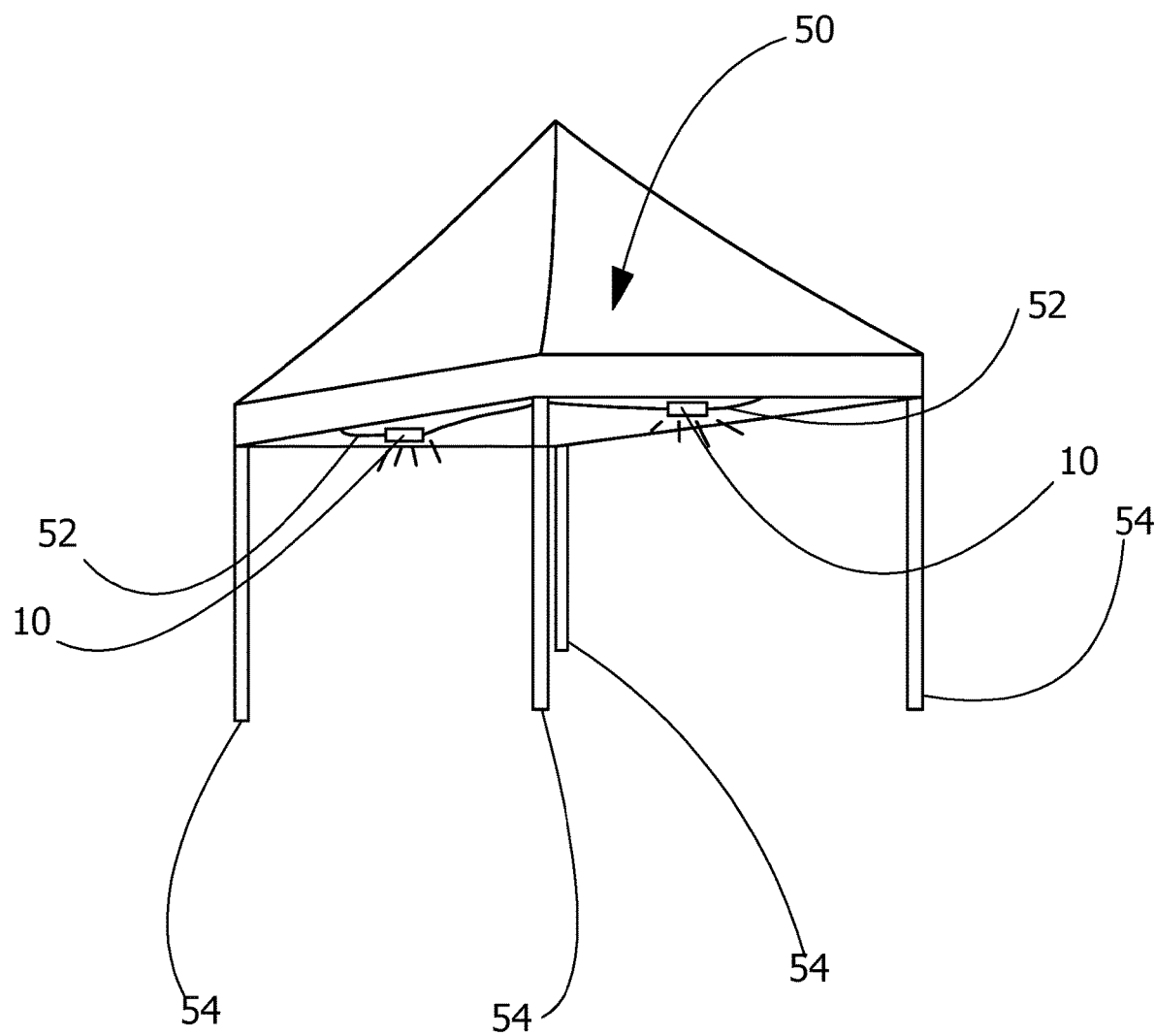
FIG. 14 is another environmental perspective view of the apparatus of FIG. 1.

In a method of using the apparatus 10 according to a preferred embodiment of the invention, the apparatus can be used to illuminate the area within and/or around a tent, canopy or like structure. The sheet 12 can be positioned on a support structure, such as one of the elongate support members that comprise the support frame for a tent, canopy or like structure. For example, the support member can be one of the elongate rods or tubes 52 supporting the top of a tent or canopy 50, as shown in FIG. 14. Alternatively, the support member can be one of the elongate poles or legs 54 that are positioned on the ground and extend upwardly therefrom to support the tent or canopy 50, shown in FIG. 14.

Figure 13:
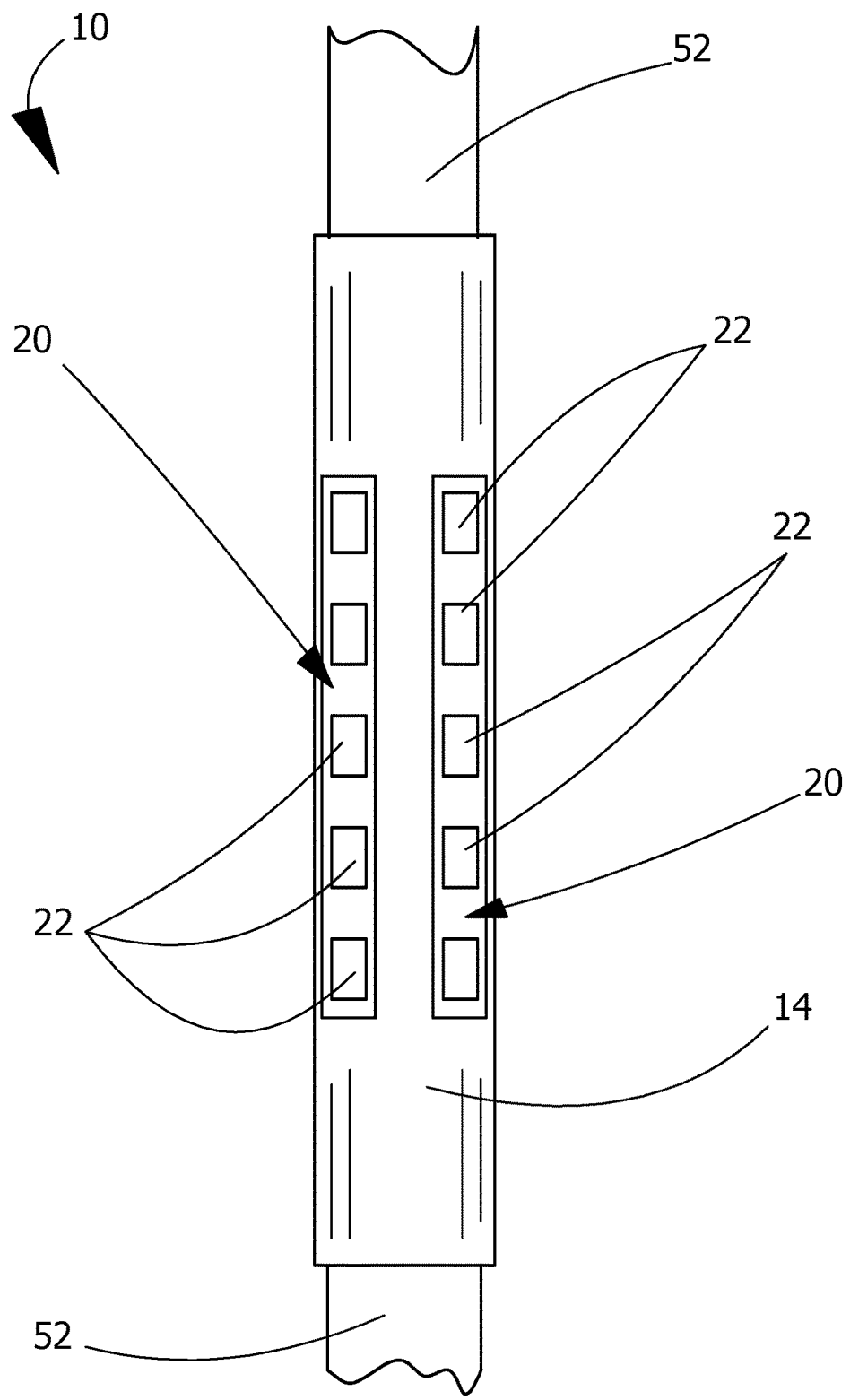
FIG. 13 is an environmental perspective view of the apparatus of FIG. 1.

As shown in FIGS. 13 and 14, the sheet 12 can be wrapped around the support member 52 with the outer surface 14 of the sheet on the outside (facing outwardly from the support member) and the inner surface 15 inside (facing inwardly toward the support member). The hook fasteners 31 proximate to side 17 are mated to the loop fasteners 30 proximate side 16 of the sheet 12 to secure securing the sheet 12 on the support member 52. The light emitting diodes 22 are activated, and illuminate the area within the tent, canopy or like structure. The illumination apparatus 10 can be attached to virtually any existing tent or canopy, and as such can be sold as an "after-market" item.

In an alternative embodiment, the apparatus 10 can include wireless technology, such as the wireless communication technology sold under the mark "BLUETOOTH", which is operatively connected to the light emitting diodes 22 and a remote control, such that the remote control can turn the light emitting diodes 22 on and off. The remote control can be a computing device comprising a computer processor, such as a computer or mobile smartphone. The remote control can be operated by a human user that activates the light emitting diodes 22 of the light assembly 20 at times the user deems appropriate. Alternatively, the remote control comprises a computer processor and a non-transitory computer readable storage medium comprising software having programming instructions that, when executed, cause the computer processor to automatically activate the light emitting diodes 22 at a predetermined time of day. In another embodiment, the software can be integrated into a mobile application that can be downloaded onto mobile smartphones and allows a user to control the light emitting diodes 22 with a mobile smartphone.

Another embodiment of the invention comprises a kit comprising a plurality of apparatuses 10. The multiple apparatuses 10 can be mounted on multiple support members 52 of a single tent, canopy or like structure, as shown in FIG. 14.

In alternative embodiments, light emitting devices are not attached to the fabric sheet 12 via rail attachment assemblies 40. For example, in one alternative embodiment, the fabric sheet comprises a plurality of pouches formed on the outer surface 14 of the sheet. The pouches can be comprised of a transparent or translucent material. A light emitting device, such as a string 21 of light emitting diodes 22 can be positioned in each transparent/translucent pouch.

In another alternative embodiment, light emitting devices can be attached to the fabric sheet 12 by an adhesive. Alternatively, the light emitting diodes can be retained within openings formed in the fabric sheet 12. In another alternative embodiment, the sheet 12 can comprise two layers of material and light emitting devices 12 can be housed in between the two layers of material.

Figure 9:
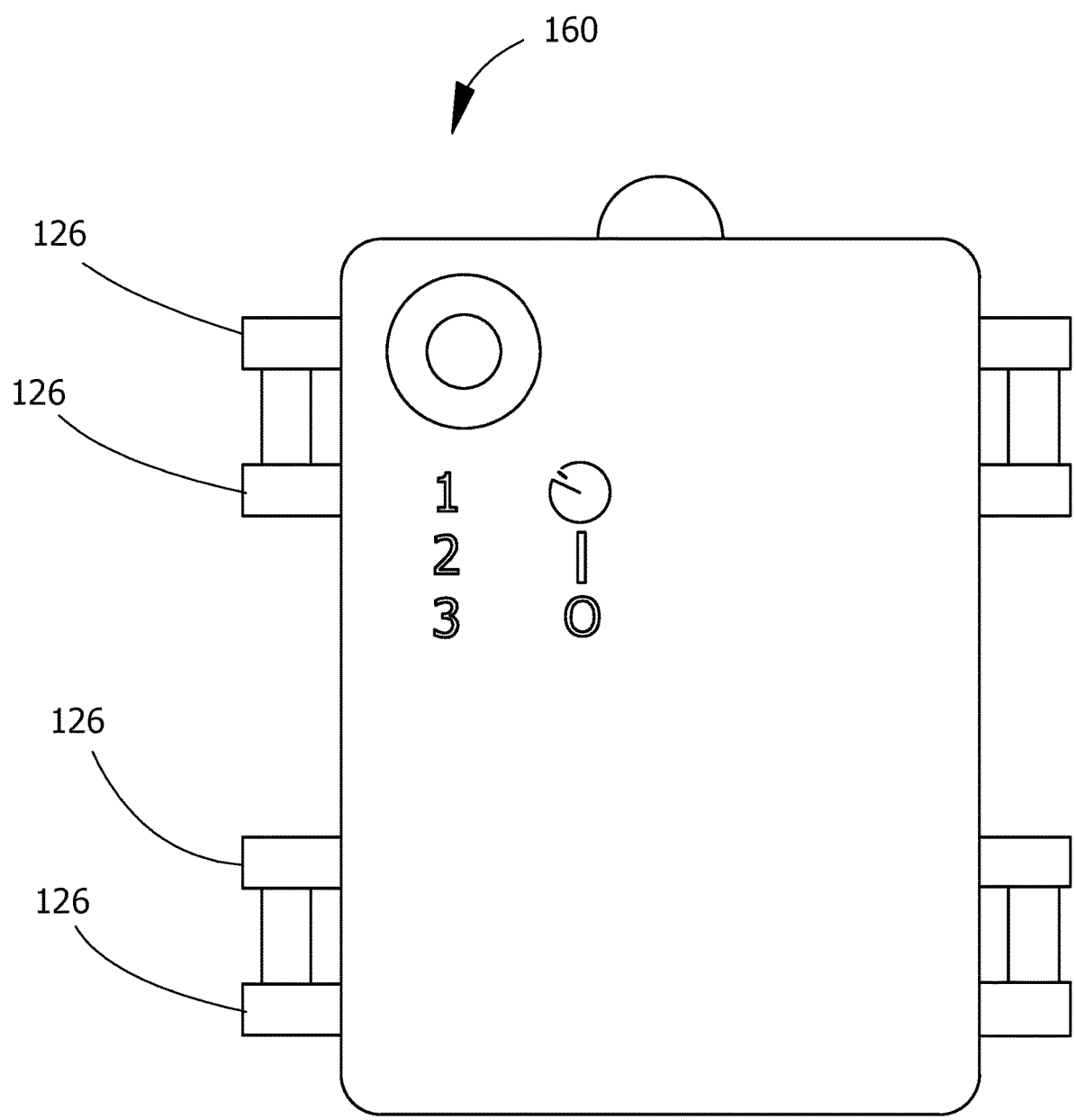
FIG. 9 is a top plan view of a power unit according to an embodiment of the invention.
Figure 10:
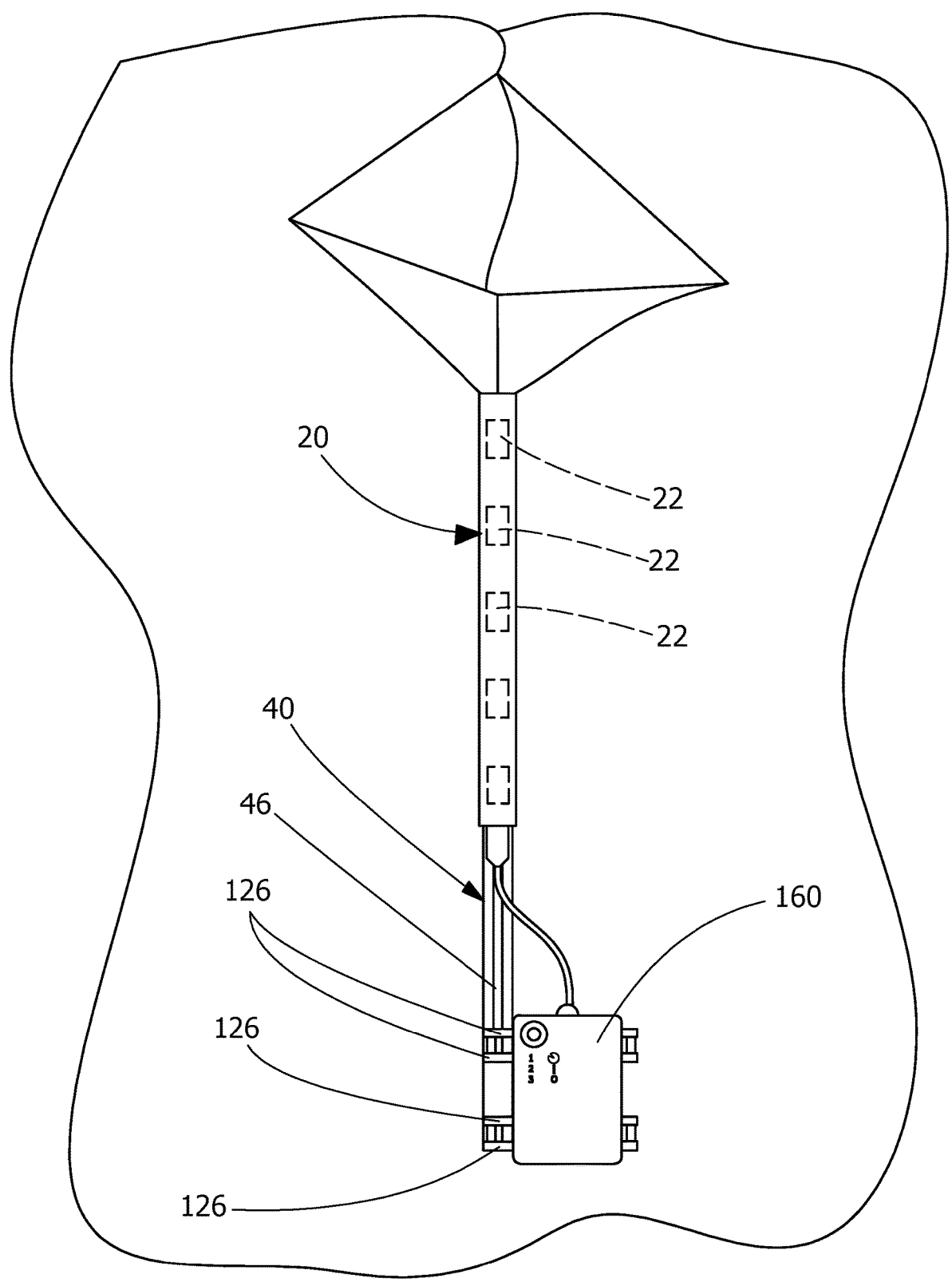
FIG. 10 is a perspective view of another embodiment of the invention.

Another embodiment of the invention comprises a tent, canopy or similar structure. At least one rail attachment assembly 40 is attached to a part of the tent, canopy or similar structure. As shown in FIG. 10, an attachment assembly 40 can be sewn at a seam of the fabric of the tent 50, and a light assembly 20 is releasably attached to the attachment assembly 40. A power unit 160, shown in FIG. 9, is adapted to power the light emitting diodes 22 and control brightness of the light emitting diodes 22. As shown in FIG. 9, the power unit 160 has a plurality of outwardly extending attachment sections 126 that are adapted for complementary engagement with the rail attachment assembly 40. Like the attachment sections 26 of the light assembly 20, the attachment sections 126 of power unit 160 define a recess channel that is sized and shaped to receive the attachment member 46 of the attachment assembly 40. As such, the power unit 160 can be releasably attached to the attachment assembly 40, as shown in FIG. 10.

While the light assembly 20 and attachment assembly 40 are described above as being utilized on a tent, the invention is not so limited. The light assembly 20 and attachment assembly 40 can be utilized with other products and structures. One embodiment of the invention comprises a gun case. The attachment assembly 40 is attached to the gun case, and the light assembly 20 is releasably attached to the attachment assembly 40.

Another embodiment of the invention comprises a backpack. The attachment assembly 40 is attached to the backpack, and the light assembly 20 is releasably attached to the attachment assembly 40. The attachment assembly 40 can be sewn to the backpack or attached by other means, such as an adhesive.

Another embodiment of the invention comprises a soft sided thermally insulated cooler. The attachment assembly 40 is attached to the cooler, and the light assembly 20 is releasably attached to the attachment assembly 40.

Another embodiment of the invention comprises a luggage bag. The attachment assembly 40 is attached to the luggage bag, and the light assembly can be releasably attached to the attachment assembly 40.

Figure 11:
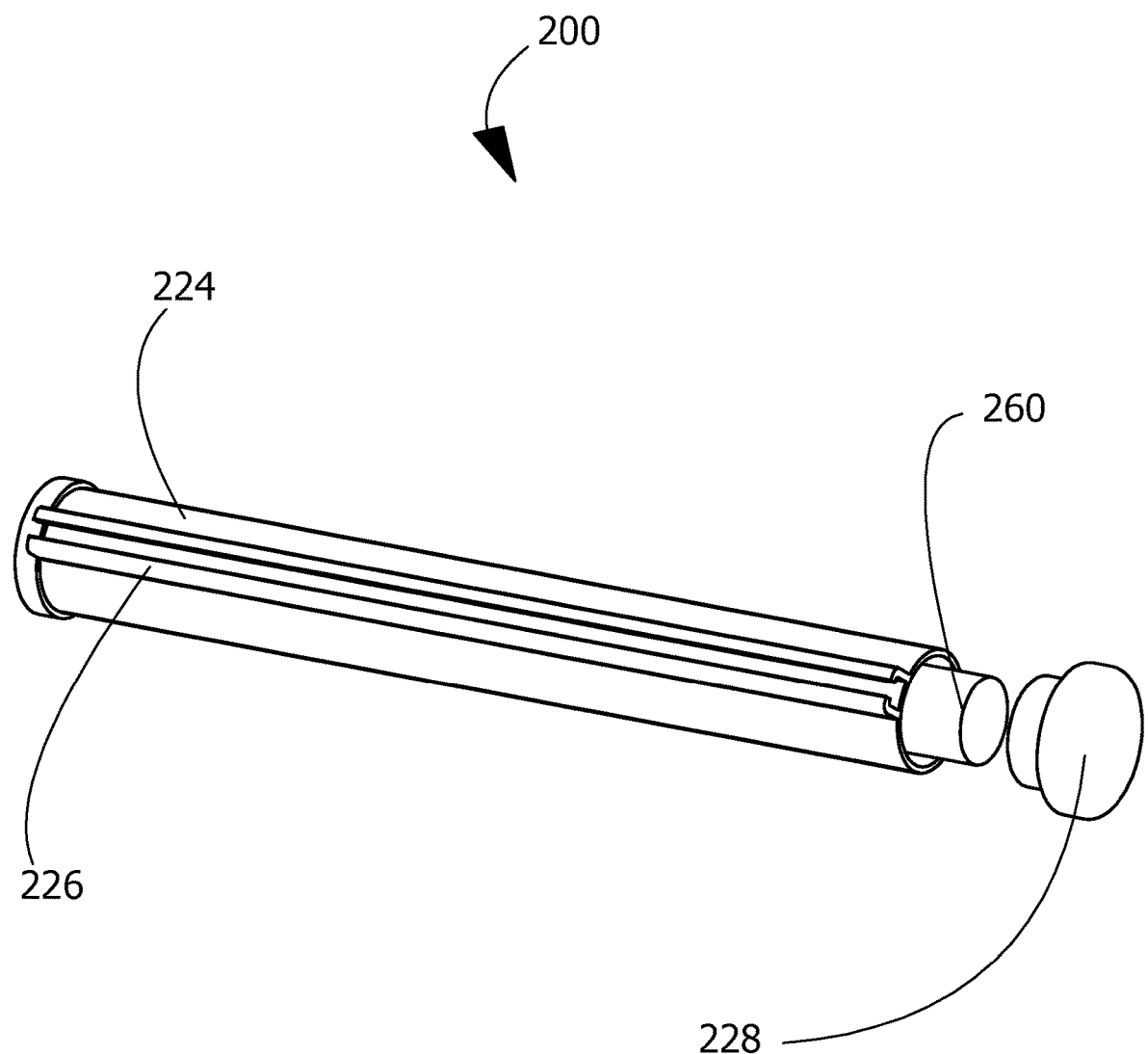
FIG. 11 is a perspective view of an illumination apparatus according to another embodiment of the invention.
Figure 12:
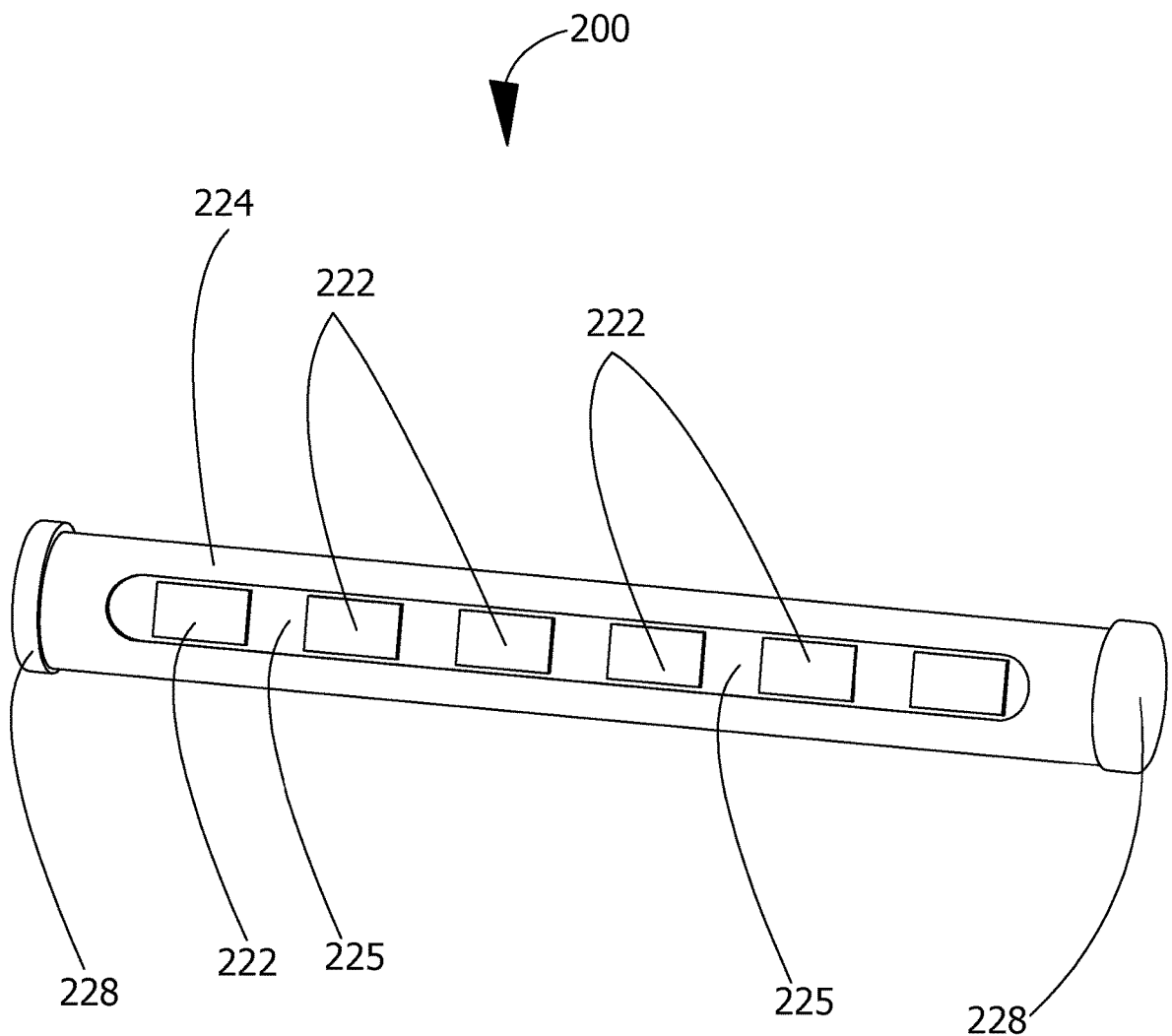
FIG. 12 is another perspective view of the illumination apparatus of FIG. 11.

A light assembly according to another preferred embodiment of the invention is illustrated in FIGS. 11 and 12, and shown generally at reference numeral 200. The light assembly 200 comprises an elongate cylindrical housing section 224 and an attachment section 226 defining a recess channel that is shaped and sized for complementary engagement with the attachment member 46 of the attachment assembly 40. As such, the light assembly 200 can be releasably attached to the attachment assembly 40 by sliding the attachment member 46 of the attachment assembly 40 into the attachment section 226 of the light assembly 200. The attachment section 226 of the light assembly 220 can have the same size and shape as the attachment section 26 of the previously described light assembly 20. The housing 224 can contain a plurality of light emitting diodes 222 and a battery 260 for powering the light emitting diodes. This eliminates the need for a separate power unit 60, 160. The housing section 224 includes a transparent or translucent section 225 through which light emitted by the light emitting diodes 22 can be seen.

According to a preferred embodiment, the light assembly 200 can include wireless technology, such as the wireless communication technology sold under the mark "BLUETOOTH", which is operatively connected to the light emitting diodes 222 and a remote control, such that the remote control can turn the light emitting diodes 20 on and off. The remote control can be a computing device comprising a computer processor, such as a computer or mobile smartphone. The remote control can be operated by a human user that activates the light emitting diodes 222 at times the user deems appropriate. Alternatively, the remote control comprises a computer processor and a non-transitory computer readable storage medium comprising software having programming instructions that, when executed, cause the computer processor to automatically activate the light emitting diodes 222 at a predetermined time of day. In another embodiment, the software can be integrated into a mobile application that can be downloaded onto mobile smartphones and allows a user to control the light emitting diodes 222 with a mobile smartphone.

An illumination apparatus and method of using same are described above. Various changes can be made to the invention without departing from its scope. The above description of embodiments of the invention are provided for the purpose of illustration only and not limitation—the invention being defined by the claims and equivalents thereof.

What is claimed is:

1. An illumination apparatus comprising:
   (a) a light assembly comprising a housing section and an attachment section, the housing section containing at least one light emitting device therein;
   (b) an attachment assembly adapted for releasable attachment with the attachment section of the light assembly, the attachment assembly comprising a substantially flat base section and a substantially oval shaped attachment member extending outwardly from the base section; and
   (c) wherein the attachment section of the light assembly defines a substantially oval shaped recess sized and shaped to receive the attachment member of the attachment assembly, whereby the light assembly and the attachment assembly are releasably attached to each other by complementary frictional engagement of the attachment member of the attachment assembly and the attachment section of the light assembly when the attachment member is positioned within the attachment section.

2. The illumination apparatus according to claim 1, wherein the attachment section of the light assembly comprises a substantially C-shaped member defining said recess.

3. The illumination apparatus according to claim 2, wherein the light assembly can slide on the attachment assembly when the attachment member is positioned in the attachment section.

4. The illumination apparatus according to claim 2, wherein the attachment assembly is attached to a substantially rectangular fabric sheet comprising an outer surface and an inner surface, and first and second opposed sides.

5. The illumination apparatus according to claim 4, wherein the attachment assembly is attached to the outer surface of the fabric sheet, and further comprising first and second complementary fasteners adapted for releasable engagement with each other, the first fastener positioned on the outer surface of the fabric sheet proximate the first side, and the second fastener positioned on the inner surface of the fabric sheet proximate the second side.

6. The illumination apparatus according to claim 5, wherein the first and second complementary fasteners comprise at least one selected from the group consisting of hook and loop fasteners, magnets and buttons.

7. The illumination apparatus according to claim 5, wherein the first fastener comprises a plurality of loop fasteners, and the second fastener comprises a plurality of hook fasteners.

8. An illumination apparatus comprising:
   (a) a flexible sheet comprising an outer surface and an inner surface and first and second opposed sides;
   (b) a light assembly comprising at least one light emitting device;
   (c) first and second complementary fasteners adapted for releasable engagement with each other, the first fastener positioned on the sheet proximate the first side and the second fastener positioned on the sheet proximate the second side; and
   (d) an attachment assembly comprising a substantially flat base section attached to the outer surface of the flexible sheet and a substantially oval shaped attachment member extending outwardly from the base section, and wherein the light assembly comprises an attachment section defining a substantially oval shaped recess sized and shaped to receive the attachment member of the attachment assembly, whereby the light assembly and the attachment assembly are releasably attached to each other by complementary frictional engagement of the attachment member of the attachment assembly and the attachment section of the light assembly when the attachment member is positioned within the attachment section.

9. The illumination apparatus according to claim 8, wherein the flexible sheet comprises a fabric.

10. The illumination apparatus according to claim 8, wherein the first fastener is positioned on the outer surface, and the second fastener is positioned on the inner surface.

11. The illumination apparatus according to claim 8, wherein the flexible sheet is rectangular.

12. The illumination apparatus according to claim 8, wherein the first and second complementary fasteners comprise at least one selected from the group consisting of hook and loop fasteners, magnets and buttons.

13. The illumination apparatus according to claim 8, wherein the first fastener comprises a plurality of loop fasteners, and the second fastener comprises a plurality of hook fasteners.

14. The illumination apparatus according to claim 8, wherein the first fastener comprises a plurality of hook fasteners, and the second fastener comprises a plurality of loop fasteners.

15. The illumination apparatus according to claim 8, further comprising at least one pouch positioned on the outer surface of the flexible sheet, and wherein the light assembly is positioned within the pouch.

16. The illumination apparatus according to claim 8, wherein the attachment section of the light assembly comprises a substantially C-shaped member defining said recess.

17. The illumination apparatus according to claim 8, wherein the at least one of the first and second complementary fasteners comprise a magnet.

* * * * *